3 Sheets—Sheet 1.

T. T. LOOMIS.

STEAM PILE-DRIVER.

No. 7,586.

Reissued April 3, 1877.

WITNESSES:

Julius Wilcke

M. H. Sherburne

INVENTOR:

Thomas T. Loomis,

By Gridley & Sherburne

Attorneys.

THE ECKERT LITHOGRAPHING CO., WASHINGTON, D. C.

T. T. LOOMIS.

STEAM PILE-DRIVER.

No. 7,586. Reissued April 3, 1877.

WITNESSES:

Julius Wilcke

N. H. Sherburne.

INVENTOR:

Thomas T. Loomis

By Bridley & Sherburne

Attorneys.

THE ECKERT LITHOGRAPHING CO., WASHINGTON, D. C.

T. T. LOOMIS.

STEAM PILE-DRIVER.

No. 7,586. Reissued April 3, 1877.

WITNESSES:

Julius Wilcke

N. H. Sherburne

INVENTOR:

Thomas T. Loomis,

By Bridley & Sherburne

Attorneys.

THE FOKERT LITHOGRAPHING CO., WASHINGTON, D. C.

UNITED STATES PATENT OFFICE.

THOMAS T. LOOMIS, OF CHICAGO, ILLINOIS.

IMPROVEMENT IN STEAM PILE-DRIVERS.

Specification forming part of Letters Patent No. 160,781, dated March 16, 1875; Reissue No. 7,586, dated April 3, 1877: application filed March 20, 1877.

*To all whom it may concern:*

Be it known that I, THOMAS F. LOOMIS, of Chicago, in the county of Cook and State of Illinois, have invented certain new and useful Improvements in Steam Pile-Drivers; and I do hereby declare the following to be a full, clear, and exact description thereof, which will enable others skilled in the art to which my invention appertains to make and use the same, reference being had to the accompanying drawings, forming part of this specification, in which—

Figure 1:
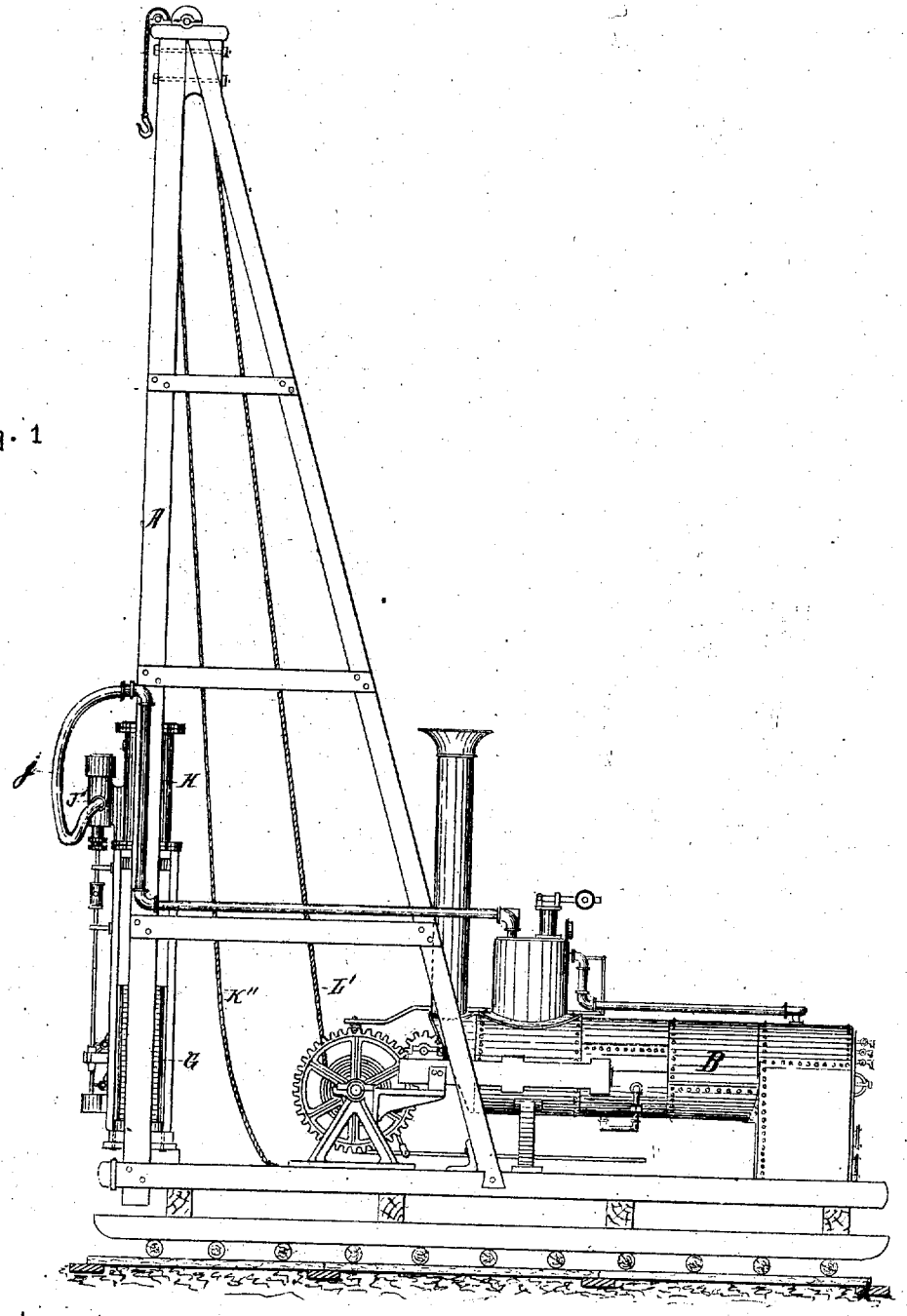
Figure 2:
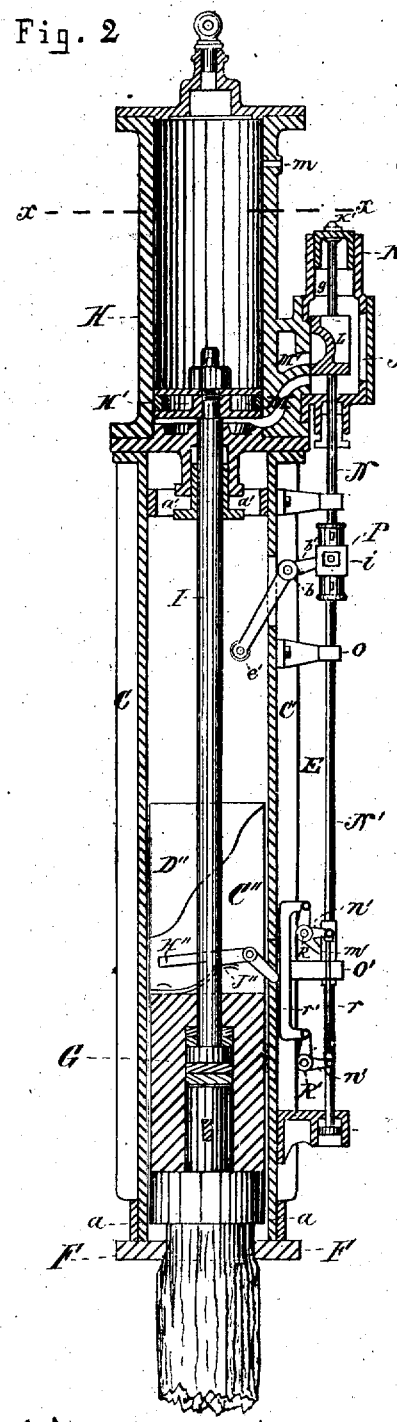
Figure 3:
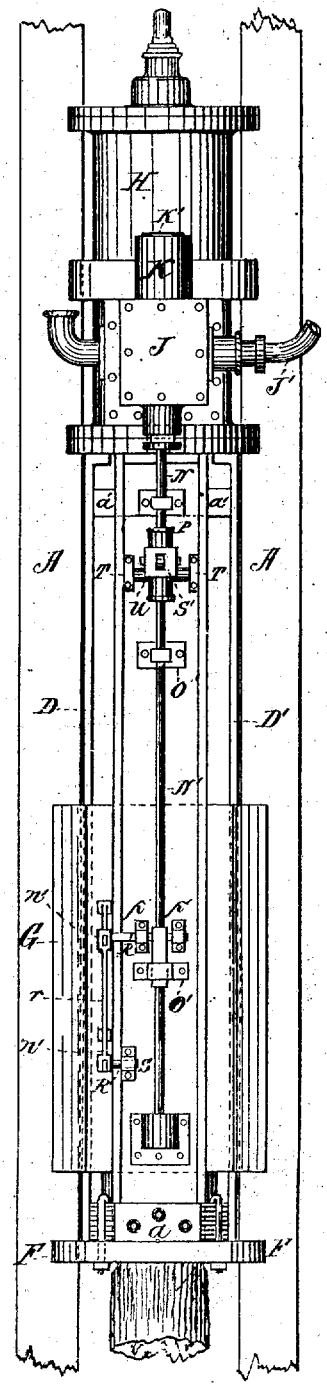
Figure 4:
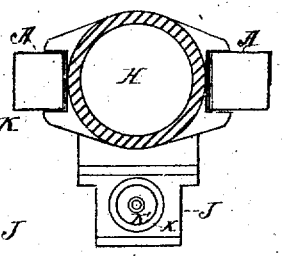
Figure 5:
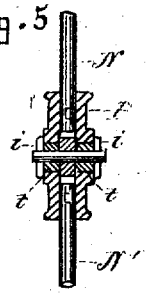
Figure 6:
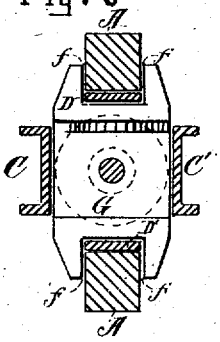
Figure 9:
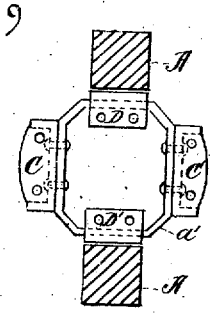
Figure 11:
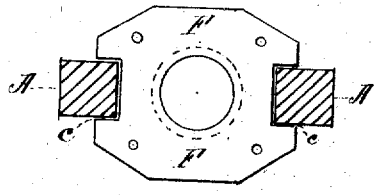
Figure 8:
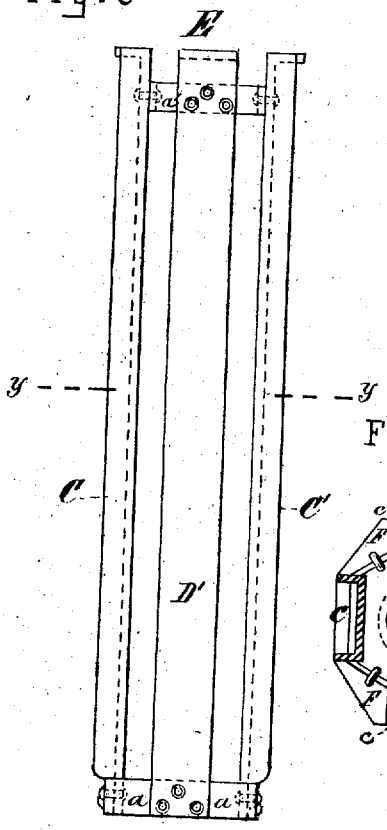
Figure 7:
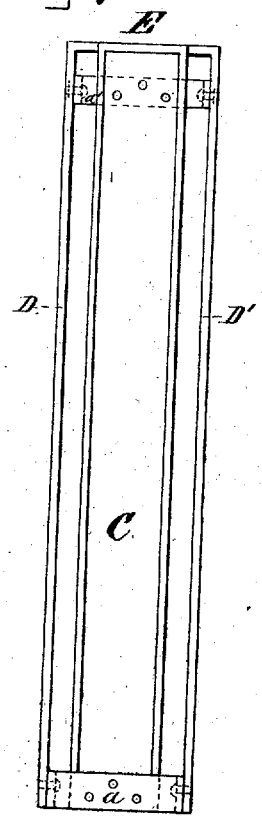
Figure 10:
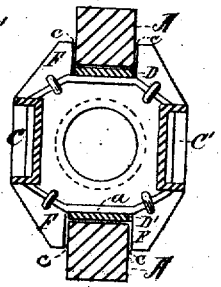

Figure 1 represents a side elevation of a steam pile-driver embodying my invention, showing its connection with the boiler. Fig. 2 represents an enlarged vertical central section of the same detached from the leaders of the derrick. Fig. 3 represents an enlarged front elevation of the same, showing its position when attached to the leaders. Fig. 4 represents an enlarged sectional plan taken on line *x x*, drawn across Fig. 2. Fig. 5 represents an enlarged vertical transverse central section of the coupling employed in uniting the connecting-rod to the valve-stem. Fig. 6 represents a top view of the hammer detached, showing the manner in which the two side legs of the hammer-frame are secured within the leaders. Fig. 7 represents an enlarged front elevation of the frame employed in supporting the cylinder detached, and Fig. 8 an enlarged side elevation of the same. Fig. 9 represents a top view of the frame when attached to the leaders. Fig. 10 represents a sectional plan of the same, taken on line *y y*, drawn across Fig. 8; and Fig. 11 represents a plan of the plate employed in guiding the pile and supporting the frame, and keeping the pile from splitting while being driven.

Like letters of reference indicate like parts.

My invention relates to that class of pile-drivers in which the cylinder and piston operating the hammer are supported upon a frame resting on the pile, and so arranged as to descend with the pile as it is being driven by the concussion of the hammer; and the object of my invention is to improve the construction and arrangements of the various parts, so that the machine can be adjusted to the leaders of an ordinary derrick and operated by the same machinery as an ordinary pile-hammer is.

To that end the improvement consists in so constructing the cylinder and frame supporting the cylinder as to fit between the leaders of an ordinary drop-hammer derrick, in combination with the hammer, grooved to receive both the side pieces of the frame and leaders of the derrick, whereby the leaders form a guide to the hammer, and the hammer a guide to the frame; also, in combination with said frame, of a grooved plate adapted to pass between the leaders and support the frame, and perforated to receive and guide the upper end of the pile, whereby the pile is prevented from being displaced or split by the concussion of the hammer; and, also, in the combination of the parts constituting the coupling employed to connect the coupling-rod to the valve-stem, all of which will be more fully understood from the following description and claims.

In the drawing, A A represent the leaders of the derrick, and B the boiler, both of which are constructed and arranged, relative to each other, in the usual manner. C C′ and D D′ are vertical metal bars, which are made of the requisite length, and are each firmly secured at the lower end to a metal band, *a*, and at the upper end to a like band, *a′*, forming a frame, E, (shown in Figs. 7 and 8,) which is of proper size laterally to fit loosely between the leaders A A of the derrick, and is so adjusted between them as to admit of an ascending or descending movement. F is a metal plate, provided on opposite sides with grooves *c c*, through which the leaders loosely pass.

The arrangement of the plate is such as to admit of a free and easy ascending and descending movement between the leaders, and by means of the side walls of the grooves, which bear against the leaders, the plate is prevented from being displaced laterally. The plate is provided at its center with an aperture, through which the upper end of the pile passes, by which means the pile is prevented from being moved or sprung laterally by the concussion of the hammer while being driven, or its own tendency to spring on its way down into the earth.

The frame is supported upon the plate and between the leaders A A, and is so arranged together with the plate as to rest its entire weight upon the pile, and to descend with the plate and pile as the pile is driven. G is the hammer, which is made of wrought or cast metal, and of the requisite size to insure the required weight. The hammer is provided on opposite sides with vertical grooves *f f*, corresponding to the grooves in the plate F, as shown in Fig. 6. The horizontal area of grooves in the hammer is such as to allow the side members D D′ of the frame E to pass loosely between the inner walls of the grooves and inner face of the leaders, and to allow the side walls of the grooves to extend outward beyond the members D D′ of the frame, and lap upon the sides of the leaders, as shown in Figs. 3 and 6. The object of fitting the members D D′ of the frame into the grooves of the hammer, and making the walls of the grooves to lap upon the sides of the leaders, is to so arrange the hammer and frame relative to each other and to the leaders as to enable the leaders to form a guide to the hammer, in combination with the side pieces D D′ of the frame, and so that the hammer will form a guide to the frame, which allows the lower end of the frame to always adjust itself to the position of the hammer when in contact with the pile, thereby preventing the concussion of the blow from being conveyed to the frame supporting the cylinder.

H is the steam-cylinder, firmly secured to the upper end of frame E by means of suitable bolts passing through its lower flange into the members of the frame, the latter being bent to admit of the same. The heads of the cylinder are provided on opposite sides with grooves arranged in the same vertical plane with the grooves in plate F, through which the leaders loosely pass, as shown in Fig. 4. H′ is the piston, and I the piston-rod, both of which are arranged within the cylinder in the usual manner. J is the steam-chest, attached to the cylinder, as shown in Figs. 2 and 3. J′ is the steam-admission pipe, attached to the side of the derrick and communicating with the boiler, as shown in Fig. 1. To the pipe J′ is attached a steam-hose, *j*, communicating with the steam-chest in the ordinary manner. The arrangement of the hose is such as to allow the cylinder to ascend or descend to any desired point within the leaders, the object of which is to allow frame E to be raised to admit the pile under it, and allow the cylinder and frame with hammer to descend as the pile is driven, without injury to the connections of the steam-supply pipe. K is a cylindrical steam-chamber, the walls of which are attached to or made as a part of the upper extremity of the steam-chest, as shown in Figs. 2 and 3, and communicates with the interior of the steam-chest through an opening in its lower end, and is provided at its upper end with a disk, K′, fitted so as to form a steam-tight joint between its periphery and the wall of the chamber, and it is so arranged as to admit of a free and easy vertical movement. L is the cut-off valve, arranged within the steam-chest in the usual manner. Firmly secured to the upper extremity of this valve is a primary valve-stem, *g*, extending upward through disk K′, and permanently secured thereto. M is the admission-port, through which the steam is admitted from the chest into the cylinder. This port is so arranged as to admit the steam immediately under the piston when at the limit of its downward movement, and as the cut-off valve is raised. M′ is the exhaust-port, arranged to communicate with port M when the cut-off valve is at the limit of its downward movement. The wall of the upper portion of the cylinder is provided with a series of exhaust-openings, *m*, communicating with the interior of the same, through which the steam exhausts as the piston is raised above the limit of its movement should the cut-off valve fail to perform its function, thereby preventing injury to the cylinder-heads by contact with the piston-head and hammer.

Firmly secured to the lower extremity of the cut-off valve is a valve-stem, N, passing through the lower end of the steam-chest, in the usual manner.

Permanently attached to the outer face of one of the members of frame E are boxes O O′, within which is secured a vertical connecting-rod, N′, the upper end of which is connected to the lower end of valve-stem N by a coupling, P, as shown in Figs. 2 and 3. Permanently secured to said member of frame E, a short distance above box O′, are boxes *p p′*, within which is secured a rock-shaft, R, carrying a pawl, *m′*, adapted to take into a mortise formed in connecting-rod N′ when said rod has reached the limit of its downward movement. A like box, S, is also secured to said member of frame E, a short distance below box O′, and within which is secured a rock-shaft, R′. Mounted upon one end of said rock-shafts R and R′ are bell-cranks *n n′*, as shown in Fig. 2. To one of the arms of each of said cranks is pivoted a connecting-rod, *r*, and to the other arm is pivoted a vertical lever, *r′*. The arrangement of the lever *r′* is such as to admit of a parallel movement laterally, by which means, as said lever is moved outward from the frame, a slight rocking movement is imparted to shafts R R′, thereby moving pawl *m* from the mortise in connecting-rod N′, and relieving the rod from its contact with the pawl, when the rod is free to move upward by the overbalanced pressure of the steam against the disk in the chamber, thereby raising the cut-off valve, which opens the admission-port to admit steam into the cylinder. Permanently attached to frame E are boxes T T, within which is journaled a rock-shaft, *u*, carrying a lever, *b*, extending inward toward the center of the frame, and provided at its inner end with an anti-friction wheel, *c′*, arranged to freely revolve. Firmly secured upon shaft *u*, or made as a part of lever *b*, is an arm, *b′*, extending outward horizontally from said shaft. The arm $b'$ passes into a mortise, $s'$, formed in coupling P, and is secured within adjustable boxes $t$ $t$, loosely fitted into mortises $i$ $i$, formed transversely through the coupling. The boxes $t$ $t$ are so adjusted within the mortises as to admit of a free and easy lateral movement, by which means the connecting-rod N′ and valve-stem are prevented from being sprung by the change of the angle of arm $b'$, produced by its movement, thus insuring a vertical movement of the valve-stem.

The hammer is provided at its center with an aperture, through which the lower end of the piston-rod passes, said rod being connected to the hammer by a collar permanently secured to its lower end, and adapted to fit against a shoulder in the aperture. The upper end of the hammer is provided with a groove, D″, extending downward to a point slightly above its center, and transversely across the same. C″ is an inclined cam, formed on the inner side of one of the walls of the groove D″, and so arranged as to engage wheel $e'$ on lever $b$ as the hammer is raised by the action of the steam. H″ is a horizontal lever, fulcrumed upon a pivot secured to the walls of the groove near its lower edge, and extends transversely across the hammer, and is so arranged as to come in contact with and against lever $r$ as the opposite end of lever H″ is moved downward by the concussion of the hammer. J″ is a spring, secured to the hammer at the lower edge of the grooves, and adjusted to bear against lever H″ slightly back of its fulcrum, by which means the lever is moved upward to its normal position after the blow is struck and the hammer is at rest. K″ is the line employed in adjusting the frame E, and L′ the line employed in lifting the pile into place between the leaders, both of which are operated in the ordinary manner.

The operation is as follows: The hammer being properly adjusted within frame E, the frame, together with the cylinder, is arranged between the leaders A A of the derrick, and elevated to a sufficient height to allow the pile to be arranged vertically, and between the leaders under plate F, which is attached to the frame. The frame is then lowered until the upper end of the pile enters the aperture in the plate. Steam is then admitted into the steam-chest, and the pressure of the steam against the disk imparts thereto an upward movement, lifting the cut-off valve, thereby opening the admission-port, when the steam enters the cylinder under the piston, and by its pressure the piston is raised, carrying with it the hammer, and as the hammer reaches the limit of its upward movement cam C″ is brought in contact with wheel $e'$ of lever $b$, tilting said lever upward, and imparting a downward movement to connecting-rod N′, consequently to the cut-off valve, preventing further admission of steam into the cylinder, and opening the exhaust-port, when the steam under the piston escapes from the cylinder, and the hammer falls. The pawl enters the mortise in the connecting-rod as the rod is moved downward, holding the same in a fixed position against the pressure of steam on the disk until the hammer reaches the pile, when the concussion tilts lever H″ downward, bringing its end against lever $r$, moving it outward, releasing the pawl from the connecting-rod, when the cut-off valve is again raised by the pressure of steam against the disk, again opening the admission-port, when the steam enters the cylinder and again lifts the hammer.

I am aware that steam pile-drivers have been used in which the hammer was lifted by the direct action of the steam; but in such cases the hammer is arranged within the frame in such a manner as that it has no direct connection with the leaders, and the plate guiding the pile is permanently attached to the hammer-frame, while in my device the lateral strain of the pile is upon the plate, and is transmitted from the plate or ring direct to the leaders; the pile being between the leaders and secured in position by the plate or ring, said plate or ring acting as a support to the frame, a guide to the pile, and a pile-protector, keeping the pile from being split by the blows of the hammer, said plate being grooved on opposite sides to receive the leaders, and having an opening in its center to receive the head of the pile.

In my device the hammer-frame is secured in position between the leaders by the hammer and plate or ring, consequently can adjust itself readily to the position of the hammer, thereby relieving the frame from the concussions of the hammer, and by providing the cylinder and plate with grooves to receive the leaders, the frame supporting the cylinder is held in line with the leaders, and by providing the hammer with grooves to receive both the side members of the frame and the leaders, the hammer and piston-rod are held in line with the cylinder, thereby insuring a free and straight action of the hammer with the bore of the cylinder, besides rendering the entire structure capable of being used in the leaders of an ordinary derrick of a steam pile-driver by removing the ordinary drop-hammer, and substituting my device without other change than a steam-connection, in the ordinary manner.

Having thus described my invention, what I claim as new, and desire to secure by Letters Patent, is—

1. The combination, with the cylinder H, having the grooves arranged in the flanges centrally on opposite sides thereof, and grooved plate F, of the hammer-frame E, all arranged to and between the leaders A A of the ordinary derrick of a pile-driver, substantially as specified.

2. The combination, with the leaders A A, of the frame E and grooved hammer G, the grooves of the hammer being adapted to receive both the side pieces of the frame and the leaders, substantially as and for the purpose specified.

3. The combination, with the frame E, of the detachable grooved plate F, adjusted to receive and guide the pile, and support the frame while driving the pile, substantially as and for the purpose specified.

4. The coupling P, provided with the adjustable boxes *t t*, to receive the lever employed to elevate and depress the coupling, in combination with the valve-stem N and connecting-rod N′, substantially as and for the purpose specified.

THOMAS T. LOOMIS.

Witnesses:

N. H. SHERBURNE,

J. MASON GOSZLER.